United States Patent [19]

Lowe

[11] 4,037,820
[45] July 26, 1977

[54] SEATLESS VALVE

[76] Inventor: Richard L. Lowe, 1906 Shaler Drive, Glenshaw, Pa. 15116

[21] Appl. No.: 713,715

[22] Filed: Aug. 12, 1976

[51] Int. Cl.² .................................................. F16K 5/04
[52] U.S. Cl. ..................................... 251/310; 222/510; 222/548; 222/553
[58] Field of Search ............... 222/553, 554, 555, 548, 222/510, 457, 353; 251/310

[56] References Cited

U.S. PATENT DOCUMENTS

| | | | |
|---|---|---|---|
| 2,321,395 | 6/1943 | Kirk | 222/353 X |
| 2,710,121 | 6/1955 | Rees | 222/457 X |
| 2,917,208 | 12/1959 | Arnold | 222/548 X |

Primary Examiner—Robert B. Reeves
Assistant Examiner—Charles A. Marmor

[57] ABSTRACT

A seatless valve for controlling the flow of granular material from a hopper or the like. The valve comprises a housing having a cylindrical spout fixed therein. Coaxial with the spout but spaced therefrom is a rotor gate having a cutaway cylindrical wall that rotates around the spout. In one position, flow through the valve is uninterrupted. In another position, the gate occupies the area of repose of the material falling through the spout, thus interrupting that flow. The housing may seal the spout and gate from the surrounding atmosphere.

11 Claims, 12 Drawing Figures

SEATLESS VALVE

BACKGROUND OF THE INVENTION

The prior art discloses numerous devices for stopping or metering the flow of granular materials. Typical of these are slide gates, rotary vane gates, quadrant gates, butterfly valves and so forth. Illustrative of the prior art are U.S. Pat. Nos. 2,885,129; 2,917,208 and 2,919,158.

Each of the prior art designs has one or more of the following deficiencies: Valve seats, seals or tight clearances between moving parts cause seizing, binding or galling, premature wear and require excessive force or torque to operate. Housings permit contamination from the surrounding atmosphere, allow internal pressure and material to leak out or allow rain water or other contamination to enter. Vanes, blades or plates enable the material to become caught between two opposing edges during the final closing which requires the particles to be sheared or crushed. This causes premature wear or damage to the parts and may prevent complete closing. The closing movement lifts, lowers or compacts material. The valve contains pockets such that the gate is not completely drainable or self-cleaning. Valves must be installed at an angle or in a fashion that prevents the inlet port and outlet port from having a common center line.

It is desirable to have available a gate that not only eliminates all of the above deficiencies, but is also simple and inexpensive to construct.

SUMMARY OF THE INVENTION

Briefly, this invention relates to a valve for metering or interrupting the flow of particulate materials without the use of the valve seats, i.e. contacting surfaces for metering and interrupting flow. This invention makes use of the little understood property of particulate solids relating to the angle of repose formed by particulate solids flowing from an orifice. Particulate materials flowing from an orifice form a frustum of a cone on the horizontal surface therebelow. The lower face of the frustum covers the area of repose upon the horizontal surface and the angle between the lower base and the cone wall is the angle of repose. For most particulate solid materials (except those highly aerated), once the frustum is formed and the area of repose covered, flow through the orifice ceases. Hence, to block flow from the orifice, it is only necessary to occupy or obstruct flow through the area of repose.

Seatless valves according to this invention comprised a sealed housing, arranged with an inlet and an outlet which may preferably be aligned. The housing has a shaft journaled in a wall and extending into the interior of the housing. The axis of the shaft forms an acute angle with the direction of flow of the particulate material. A spout is fixed within the housing and is spaced from the internal walls of thereof for reasons that will become apparent. The spout comprises a cylindrical wall coaxial with the shaft. The spout is open at its upper end and communicates with the inlet of the housing. It is also open at its lower end. The opening at its lower end comprises the orifice for building the frustumated cone as further explained herein. Preferably, the housing comprises two flanged parts and the spout has a flange at its upper end which when sandwiched between the housing flanges is secured in place.

Fixed to the shaft is a rotor gate which comprises a generally radially extending base and a cylindrical wall coaxial with the shaft. The cylindrical wall of the rotor gate has an inner diameter greater than the outer diameter of the spout wall. The cylindrical wall of the gate rotor rotates around the spout spaced a minimum selected distance therefrom. The spacing is selected to be either much smaller or much larger than the average particle size of the particulate solid being passed through the valve. In this way seizing and binding is avoided.

The cylindrical wall of the rotor gate is cut away such that at one angular position of the rotor and shaft, flow through the spout is unobstructed. The rotor gate at another angular position, say 180° away, causes the area of repose of the material falling from the spout to be occupied thus stopping flow through the spout. Notice that interruption of flow is effected without the closing of two surfaces and hence, the valve is seatless. In an alternate embodiment, an air seal is provided between the inlet and outlet. But even in that embodiment, insofar as the particulate material is concerned, the valve is seatless. In intermediate positions, the flow is metered or controlled at a rate between full open and full close.

According to a preferred embodiment of this invention the spout comprises a cylinder truncated at its lower end by a plane substantially (within 20°) perpendicular to the direction of flow (usually the horizontal plane). It is further preferred that the cylindrical wall of the rotor gate is truncated by a plane which when rotated about the axis of the shaft, may be brought substantially (say within 20°) perpendicular to the direction of the material flow.

In one embodiment, the cylindrical wall of the gate is truncated by a plane passing the periphery of the base thereby permitting self-draining of the valve. When the valve is rotated to the open position, the point where the truncated edge coincides with the base, points downward permitting emptying of the valve.

In an alternate embodiment the cylindrical wall of the gate is truncated by a plane that does not pass through the base. Also, the gate and the spout are arranged to radially overlap (but not touch) around their entire peripheries when the gate is rotated to the closed position. In this way, a seal such as an O-ring on the outer periphery of the spout provides an air-tight seal between the inlet and outlet of the valve. In this embodiment, insofar as the particulate material is concerned, the valve is still seatless. The O-ring is protected from the particulate material in all positions of the rotor gate because it is always above the surface of the materials held by the valve or flowing through the valve.

In applicant's seatless valve, all moving parts that are in contact with the material being metered are isolated from each other so that no direct rubbing action occurs between these parts. There are no bearings, supports or seals in direct contact with the material and most all clearances are intentionally large to eliminate jamming due to particles. The action of the edges of the moving parts is one of slicing, which prevents jamming and allows minimal operating torque. All wearing parts are individually replaceable and the housing contains no wear points. The valve housing permits a large pressure differential between the interior of the housing and the outside atmosphere. A rotary gate imparts only sliding motion with the material being metered thus eliminating any lifting, lowering, compacting or other displacement of the material.

The rotating gate is capable of rotating to the closed position without damage or other detriment when the exit conduit is full and material is backed up through the entire valve. Even in the zero flow condition, the rotary gate may be freely closed.

BRIEF DESCRIPTION OF THE DRAWINGS

The above and other objects and advantages of the invention will be more fully understood and appreciated with reference to the following description and drawings in which.

DETAILED DESCRIPTION

Figure 1:
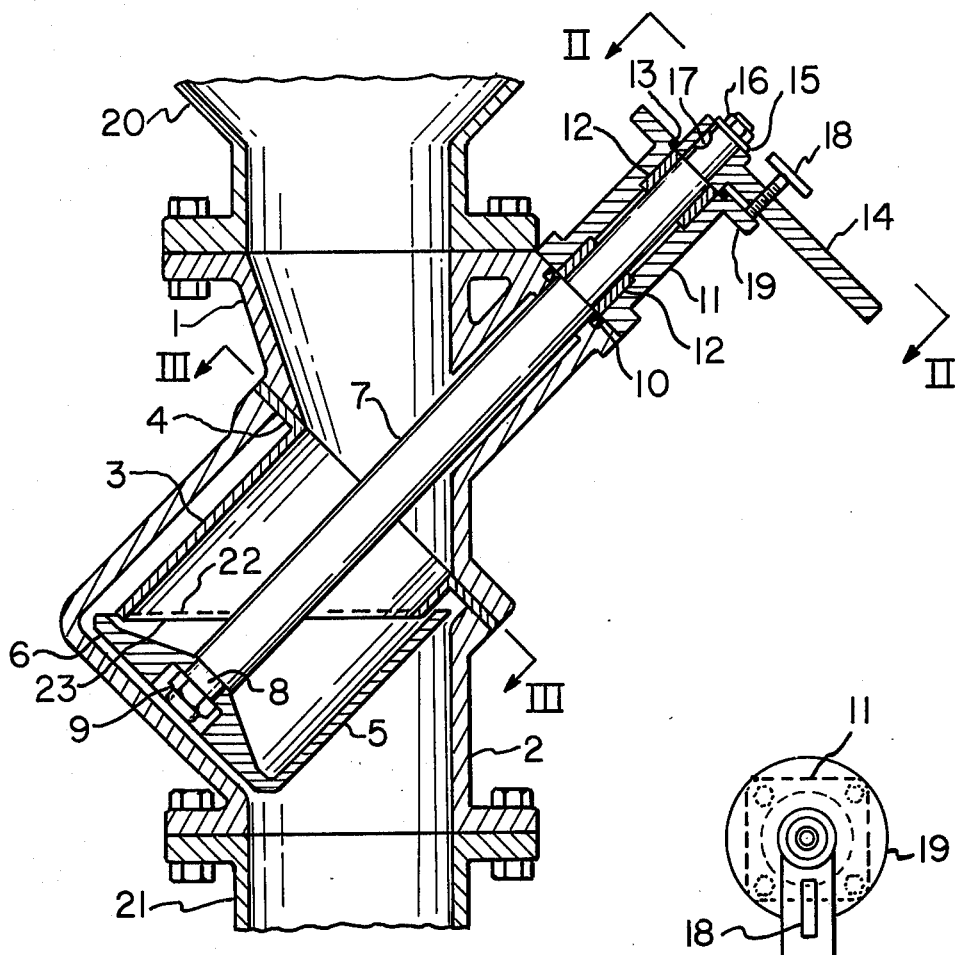
FIG. 1 is an elevational view in partial section of one embodiment.
Figure 2:
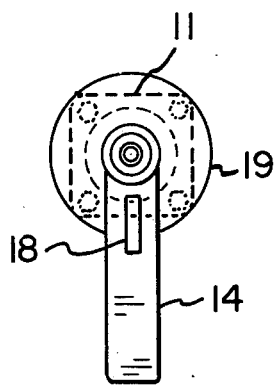
FIG. 2 is a view of the exposed end of the shaft taken along lines II—II of FIG. 1.
Figure 3:
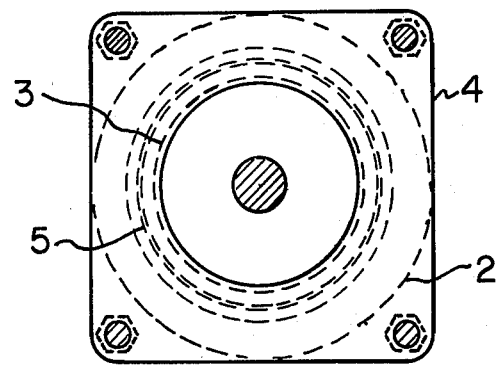
FIG. 3 is a sectional view taken along lines III—III of FIG. 1 showing the plans arranged for joining the two portions of the valve housing.

Referring to the drawings and in particular to FIGS. 1, 2 and 3, the valve housing comprises an upper valve housing 1, connected, for example, to a hopper 20, the latter of which could be a pipe, tank, bin or any other such conduit. The lower valve housing 2 connects to the exit conduit 21, the latter of which could be a tank, bin, hopper or other conduit or simply could discharge into the atmosphere. Between the upper housing 1 and the lower housing 2, is positioned flange 4 which is integral with a truncated cylindrical spout 3 inclined at an angle of approximately 45° to the direction of flow (here shown vertical). The end of the spout 3 nearest the exit conduit, defines an oval or eliptical opening 23 lying in a plane generally perpendicular to the direction of flow and preferably horizontal.

A shaft 7 is journaled to the upper housing on an angle with the direction of flow. The shaft is coaxial with the truncated cylindrical spout. Ample clearance is provided between shaft 7 and upper housing 1 in the volume which may be occupied by material thus preventing particles from interfering with the rotary motion of the shaft 7. A seal 10 is provided at the point where shaft 7 passes into the upper housing 1 to prevent escape of pressure or material from the inside of the gate. A well around the shaft opens into the interior of the upper housing.

The upper portion of shaft 7 is reduced in diameter and passes through bearing housing 11. Bearings 12 are provided to hold the shaft 7 in alignment and to allow rotation. These bearings may be metallic bushings or any type of ball bearings, roller bearings or the like. Shaft 7 is prevented from moving axially by bearing housing 11 because the shoulder of shaft 7 makes contact with the lower bearing 12. The bearing housing 11 is secured to the upper housing through a flange connection as seen in FIG. 2.

At the point where the shaft 7 exits the bearing housing 11, the diameter of the shaft 7 is reduced to accommodate handle 14. A key and keyway 17 are provided to prevent rotation between the shaft 7 and the handle 14. The handle 14 is secured to the shaft 7 by a threaded end on shaft 7, washer 15 and nut 16. Shaft 7 is prevented from moving downward because of the hub of the handle 14 being in contact with the upper bearing 12.

A seal 13 is situated at the point where shaft 7 passes through the bearing housing 11 and seals against the hub of handle 14 to prevent water or other contamination from entering the gate.

The bearing housing 11 contains a lug 19 against which screw 18 in the handle 14 can bear. The handle 14, when the desired position is obtained, can be locked in place by tightening screw 18. Continuous adjustment is therefore provided between the full open and full closed positions.

Situated in the lower end of spout 3 is the rotary gate. The gate is fixed to the shaft 7. The base 6 of the gate is essentially a disc and the sides 5 of the gate a hollow truncated cylinder. The top of the gate is preferably removed in a plane perpendicular to the axis of flow (gate in the closed position) so as to form an oval or eliptical opening 22.

The spout 3 and the gate 5 are both concentric hollow cylinders with spout 3 having an outside diameter substantially smaller (considering the size of the material being metered) than the inside diameter of the gate, thus allowing adequate clearance for the particles of material. The spout 3 and the rotor 5, 6 are arranged so that the oval openings 23 and 22, respectively, axially overlap when both openings are in the position perpendicular to flow. The openings overlap in the sense that the opening of the rotor 23 occupies an area directly below and somewhat greater than the opening of the spout 22.

The gate is connected to the shaft 7 by means of a square hole 8 in the base 6 and a square shank on shaft 7 and a lock nut 9 to secure the assembly. It can be seen that the gate is prevented from turning with respect to shaft 7.

Figure 4:
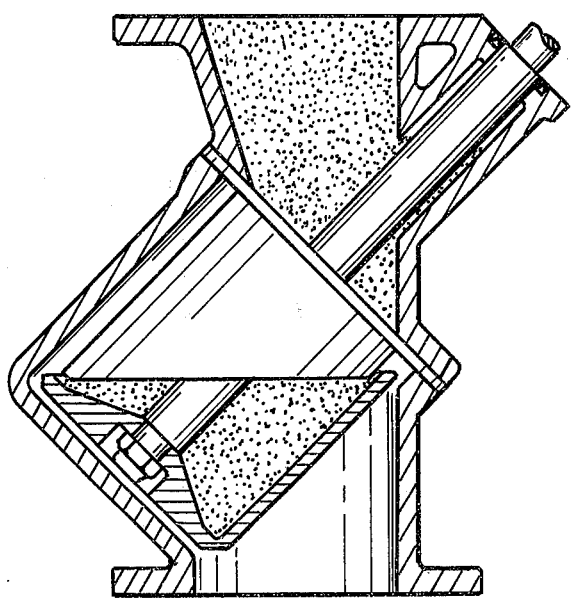
FIGS. 4 and 5 are elevational views in partial section showing the valve of FIG. 1 in the closed and opened positions, respectively, to illustrate the operation of the valve.
Figure 5:
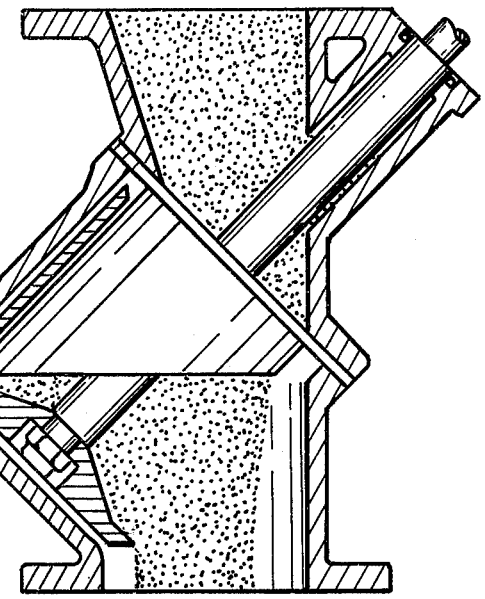
Figures 7A, 7B, 7C:
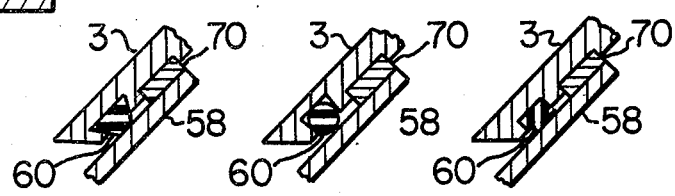
FIGS. 7A, 7B and 7C are section views of alternate sealing arrangements as might be used with the alternate embodiment of FIG. 6.

Referring to FIG. 4, it can be seen that when the valve is in the closed position with the openings in the spout and the gate both horizontal, material is prevented from flowing through the gate even though a substantial gap exists between the spout and the gate. This is as a result of the unique phenomena of granular materials relating to their internal friction and frustum of repose. According to applicant's invention, shut off may be achieved for all materials even if the material has an angle of repose of zero. In actual practice, all flowing types of granular materials have some angle of repose greater than zero unless highly aerated. FIG. 5 shows the gate in full open position. It can be seen that orifice opening is substantial compared to the basic entrance and exit openings. The material therefore passes through the gate with relatively little restriction.

The clearances between the moving parts of the gate are varied depending upon the material being handled. These pertinent clearances are between the shaft 7 and upper housing 1, between the spout 3 and gate and between the gate and the lower housing 2. In general, clearances should never be in the range of the particle size itself or the particles may tend to become lodged between moving parts. It is feasible to provide clearances that are either substantially larger or smaller than the mean particle size of the material. In this way, the particles are either too large to enter the space or small enough to move within the space. It is preferred, however, that the clearances be substantially greater than the largest particle size to be encountered. In the case of fine readily aerated materials, the clearances between the spout and rotary gate 5, 6 should be kept to a minimum and should be slightly greater than the largest particle size in order to prevent "flushing" through the gate. However, the clearances between shaft 7 and upper housing 1 and between rotor 5, 6 and the lower housing 2 should be generous to prevent bridging, compacting and build-up between these parts.

Figure 6:
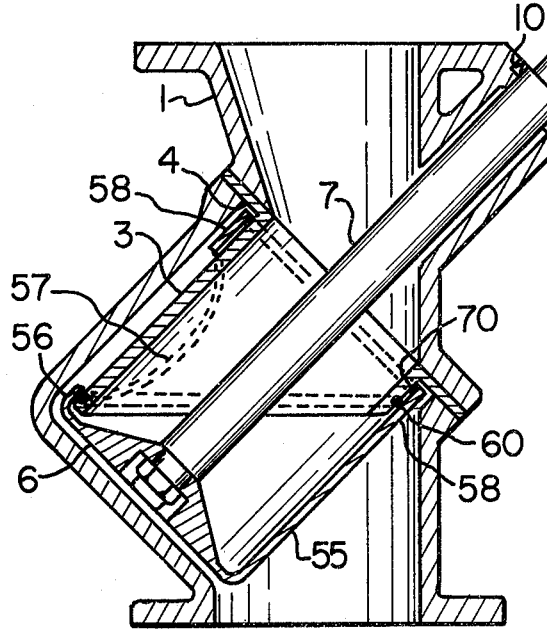
FIG. 6 is an elevation view in partial section of an alternate embodiment according to this invention in which the valve provides an air-tight seal in the closed position.

Referring to FIG. 6, an alternate embodiment is illustrated in which the valve provides an air-tight seal between the inlet and exit conduits. All common elements in FIGS. 1 and 6 are identified with like numerals. The seal 60, for example, an O-ring, is set in a groove in the exterior of the spout 3. The gate 55 must have a lower lip 56 such that when the gate is in the closed position, the gate contacts the seal along its entire outer edge. Otherwise, the gate may have an eliptical opening substantially as shown in FIG. 1. As shown in FIG. 6, however, the gate 55 is a right cylinder with an opening 57 removed from a portion of the cylindrical wall. A band 58 is left intact completely around the open edge of the cylinder. Its purpose is now to be described. With an O-ring seal, it is desirable to place a bearing or bushing 70 between the gate 55 and spout 3. The bushing is positioned between the exterior surface of the spout 3 and the interior surface of the band 58.

Figure 8:
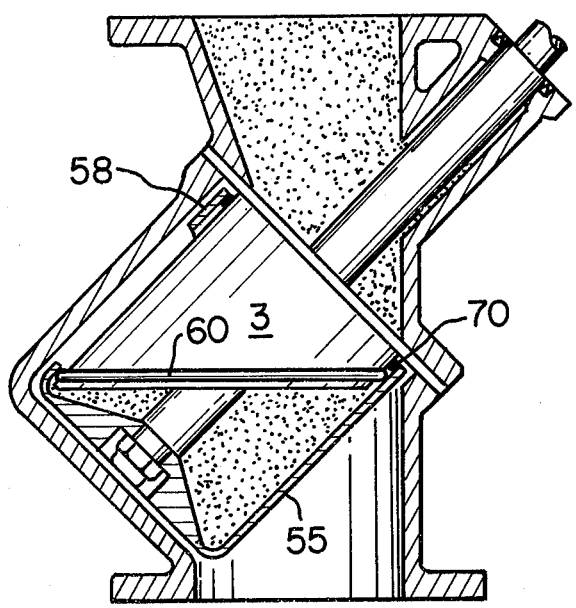
FIGS. 8, 9, and 10 are elevational views in partial section showing the valve of FIG. 6 in closed, full open and intermediate position to illustrate the operation of the valve.
Figure 9:
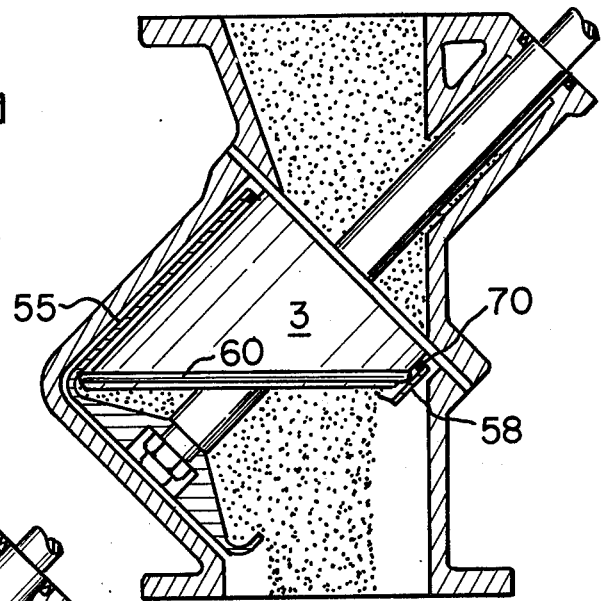
Figure 10:
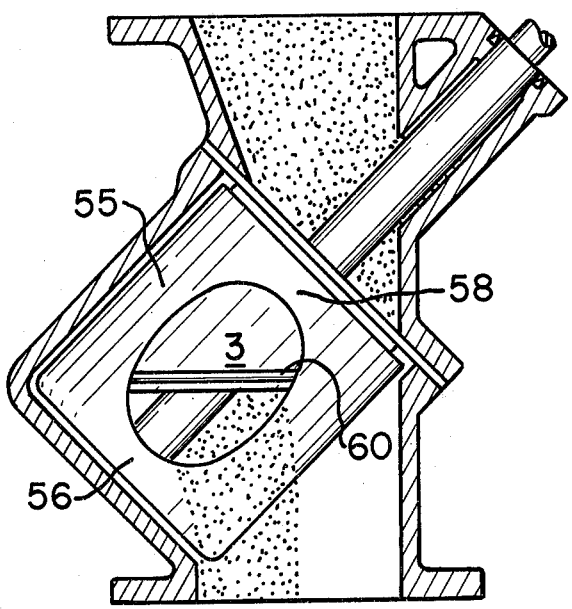

It should be understood that even in the embodiment of FIG. 6, the stoppage of material is not due to the O-ring but the angle of repose of the material. The material is never forced against the O-ring but is allowed to fall away from the O-ring. The O-ring only provides an air-tight seal. This is best illustrated by reference to FIGS. 8, 9 and 10 showing the gate in three different positions. In each position, the metered material is not in contact with the seal or O-ring.

Having thus described my invention with the detail and particularlity as required by the patent laws, what is desired protected by Letters Patent is set forth in the following claims.

1. A seatless valve for metering or interrupting the flow of particulate materials comprising,
    a housing arranged with an inlet at the top and an outlet at the bottom thereof,
    a shaft journaled in the housing and extending thereinto at an acute angle to the direction of flow of the particulate materials,
    a spout fixed with the housing and spaced therefrom generally comprising a circular cylindrical wall coaxial with said shaft, said spout opening at the upper end thereby in communication with the inlet to the housing and said spout opening at the lower end,
    a rotor gate fixed to turn with said shaft, said gate comprising a radially extending base and a cylindrical wall coaxial with said shaft and spout, the cylindrical wall of said gate having an inner diameter greater than the outer diameter of the cylindrical wall of the spout, the base and cylindrical wall of said gate having minimal spacing from said spout at all angular positions of said shaft and gate, said cylindrical wall of said gate being cut away such that at one angular position of the shaft and gate, flow through the valve is unobstructed and in another angular position of the shaft and gate, the gate without touching the spout causes the area of repose of the material falling from the spout to be occupied thus stopping flow and in intermediate angular positions of the shaft and gate, particle flow is metered.

2. A seatless valve according to claim 1 in which the shaft enters the housing above the gate and a well in the wall of the housing extends back along the shaft from the interior of the housing.

3. A seatless valve according to claim 1 in which the spout comprises a cylindrical wall truncated at the lower end by a plane substantially perpendicular to the direction of flow.

4. A seatless valve according to claim 1 in which the cylindrical wall of the rotor gate is truncated along a plane which may be rotated about the cylindrical axis to be substantially perpendicular to the direction of flow.

5. A seatless valve according to claim 1 in which the minimal spacing between the spout and rotor gate is sufficiently small or sufficiently large to avoid binding depending upon the average size of the materials being passed through the valve.

6. A seatless valve according to claim 1 wherein the rotor gate cylindrical wall radially overlaps the spout around its entire lower edge and wherein an air-tight seal is provided between the spout and the rotor gate comprising sealing means on the outer surface of the spout for engaging both the spout and the rotor gate when the gate is rotated to obstruct material flow, whereby the particulate material is not metered past or obstructed by the sealing means.

7. A seatless valve according to claim 1 wherein the cylindrical wall of the rotary gate comprises a continuous cylindrical band radially outward of the spout and a bearing or bushing between said band and spout.

8. A seatless valve according to claim 1 in which the housing comprises an upper casing having a flange at its lower end and the lower casing having a flange at its upper end and in which the spout has a flange at its upper end and such that when the three flanges are placed side by side and secured with the spout flange in the middle, the spout is held in spaced relationship to the housing.

9. A seatless valve according to claim 1 in which the inlet opening and the outlet opening are aligned.

10. A seatless valve according to claim 1 in which the shaft typically forms an angle of about 45° with the direction of the flow.

11. A seatless valve according to claim 1 in which the cylindrical wall of the spout is truncated by a plane forming an angle of less than 20° with a plane perpendicular to the direction of flow.

* * * * *

UNITED STATES PATENT AND TRADEMARK OFFICE
CERTIFICATE OF CORRECTION

PATENT NO. : 4,037,820
DATED : July 26, 1977
INVENTOR(S) : Richard L. Lowe

It is certified that error appears in the above-identified patent and that said Letters Patent are hereby corrected as shown below:

Claim 1 - Column 5 Line 53 "with" should read --within--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks